United States Patent
Gottin et al.

(10) Patent No.: US 12,079,732 B2
(45) Date of Patent: Sep. 3, 2024

(54) CROSS-ORGANIZATION CONTINUOUS UPDATE OF EDGE-SIDE EVENT DETECTION MODELS IN WAREHOUSE ENVIRONMENTS VIA FEDERATED LEARNING

(71) Applicant: Dell Products L.P., Round Rock, TX (US)

(72) Inventors: Vinicius Michel Gottin, Rio de Janeiro (BR); Pablo Nascimento da Silva, Rio de Janeiro (BR); Paulo Abelha Ferreira, Rio de Janeiro (BR)

(73) Assignee: DELL PRODUCTS L.P., Round Rock, TX (US)

( * ) Notice: Subject to any disclaimer, the term of this patent is extended or adjusted under 35 U.S.C. 154(b) by 60 days.

(21) Appl. No.: 17/694,173

(22) Filed: Mar. 14, 2022

(65) Prior Publication Data
US 2023/0289169 A1  Sep. 14, 2023

(51) Int. Cl.
*G06F 11/36* (2006.01)
*G06F 8/65* (2018.01)
(Continued)

(52) U.S. Cl.
CPC .............. *G06N 3/098* (2023.01); *G06F 8/65* (2013.01); *G06F 11/3692* (2013.01); *G06F 21/60* (2013.01); *G06N 20/00* (2019.01)

(58) Field of Classification Search
CPC ........ G06F 8/65; G06F 16/27; G06F 11/3692; G05B 19/4185; G06N 3/063; G06N 3/045;
(Continued)

(56) References Cited

U.S. PATENT DOCUMENTS

2008/0262875 A1* 10/2008 Plavnik .................. G16H 40/67
705/2
2020/0193313 A1*  6/2020 Ghanta .................. G06N 20/00
(Continued)

OTHER PUBLICATIONS

McMahan et al., "Communication-efficient learning of deep networks from decentralized data," Proceedings of Machine Learning Research (PMLR), vol. 54, pp. 1273-1282, Feb. 17, 2016.
(Continued)

*Primary Examiner* — Tuan A Vu
(74) *Attorney, Agent, or Firm* — Workman Nydegger

(57) ABSTRACT

One example method includes deploying, from a central node, respective instances of an event detection model to each edge node in a group of edge nodes, providing training data to the edge nodes, wherein the training data is usable by each of the edge nodes to train its respective instance of the model, and wherein the training data comprises data obtained from an environment other than an environment in which the edge nodes operate, receiving, by the central node from the edge nodes, gradients that capture differences between the instance of the model, and updated instances of the model that were updated by the edge nodes as part of a training process performed at the edge nodes, updating, by the central node, the model with the gradients to create an updated model, and deploying, by the central node, respective instances of the updated model to the edge nodes.

18 Claims, 9 Drawing Sheets

(51) Int. Cl.
*G06F 21/60* (2013.01)
*G06N 3/098* (2023.01)
*G06N 20/00* (2019.01)

(58) Field of Classification Search
CPC .... G06N 20/00; G06N 3/098; H04L 67/1001; H04L 9/008; G16H 40/67
See application file for complete search history.

(56) References Cited

U.S. PATENT DOCUMENTS

| | | |
|---|---|---|
| 2020/0326680 A1* | 10/2020 | Wang ................ G05B 19/4185 |
| 2020/0364603 A1* | 11/2020 | Oktay .................... G06N 20/00 |
| 2021/0117249 A1* | 4/2021 | Doshi ................. H04L 67/1001 |
| 2021/0125722 A1* | 4/2021 | Sherkat ................ G06V 10/764 |
| 2021/0174257 A1* | 6/2021 | Pothula ................... G06F 16/27 |
| 2021/0225463 A1* | 7/2021 | Knighton, Jr. .......... G06N 3/045 |
| 2021/0350211 A1* | 11/2021 | Dalli ....................... H04L 9/008 |
| 2021/0406782 A1* | 12/2021 | Nakayama ............. G06F 16/27 |
| 2021/0407678 A1* | 12/2021 | Arcot Desai ............. G06F 8/65 |
| 2023/0068386 A1* | 3/2023 | Akdeniz ................ G06N 3/063 |

OTHER PUBLICATIONS

Li, "Federated learning: Challenges, methods, and future directions," arXiv, Cornell University, Computer Science, Machine Learning, arXiv:1908:07873, Aug. 21, 2019.

Bernstein et al., "SignSGD: Compressed Optimisation for Non-Convex Problems," arXiv, Cornell University, Computer Science, Machine Learning, abs/1802.04434, Aug. 7, 2018.

* cited by examiner

CROSS-ORGANIZATION CONTINUOUS UPDATE OF EDGE-SIDE EVENT DETECTION MODELS IN WAREHOUSE ENVIRONMENTS VIA FEDERATED LEARNING

FIELD OF THE INVENTION

Embodiments of the present invention generally relate to the logistics of managing operations in various environments. More particularly, at least some embodiments of the invention relate to systems, hardware, software, computer-readable media, and methods for using event detection as a basis for federated learning across multiple environments so as to control various operations in those environments, while remaining sensitive to associated data privacy concerns.

BACKGROUND

Event detection in an environment may be helpful in devising approaches to avoid the future occurrence of such events, and others, in an environment. Detection of events may be performed using various sensors operating in an edge computing environment. However, event detection approaches that leverage sensor data at the edge present technical challenges. For example, the data available at the edge node may not fully represent the domain for that edge node in the future. Hence, a typical approach is to gather training data from several edge nodes over time and perform centralized training. This approach may be adequate when the edge nodes do not have sufficient computational resources to perform model training.

In the cases in which edge nodes possess sufficient computational resources for training, however, this approach becomes inefficient. Particularly, the data must be transferred to a central node, such as a near-edge node, for privacy concerns, in order for the model to be trained and the updated model then sent back to the edge node. This makes updating the model difficult, for example. Furthermore, the generalization of the models is desirable so that the edge nodes may be able to detect events they have not experienced themselves. However, model drift may occur over time, as the operation of the edge nodes deviates from the training data. Further, such drift is enormously exacerbated if there are distinct modes of operation in the domain, for example, if some systems in a particular environment suddenly start performing a very different set of tasks, or if the environment changes in some material way.

If cross-organization data could be leveraged for the training of such systems, it might be possible that at least some of the aforementioned constraints may be somewhat attenuated. For example, when events of interest are rare, they may not happen, and thus not be sufficiently represented for training, in the edge nodes of a certain organization. Leveraging the learned experiences of other organizations in which such events did happen may lead to broader generalization. This, however, creates data privacy concerns. That is, the organizations may not want or allow their data to be shared with other organizations of a similar domain, such as if those other organizations are competitors.

Considerations such as those just noted may suggest the application of a federated learning approach. Such an approach may possible solve privacy concerns and may support training of shared models. However, in large scale environments in which modes of operation or gradual concept drift happen, the federated learning approach may not converge and/or end up with a model that punishes rare behavior, that is, certain rare events of interest.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
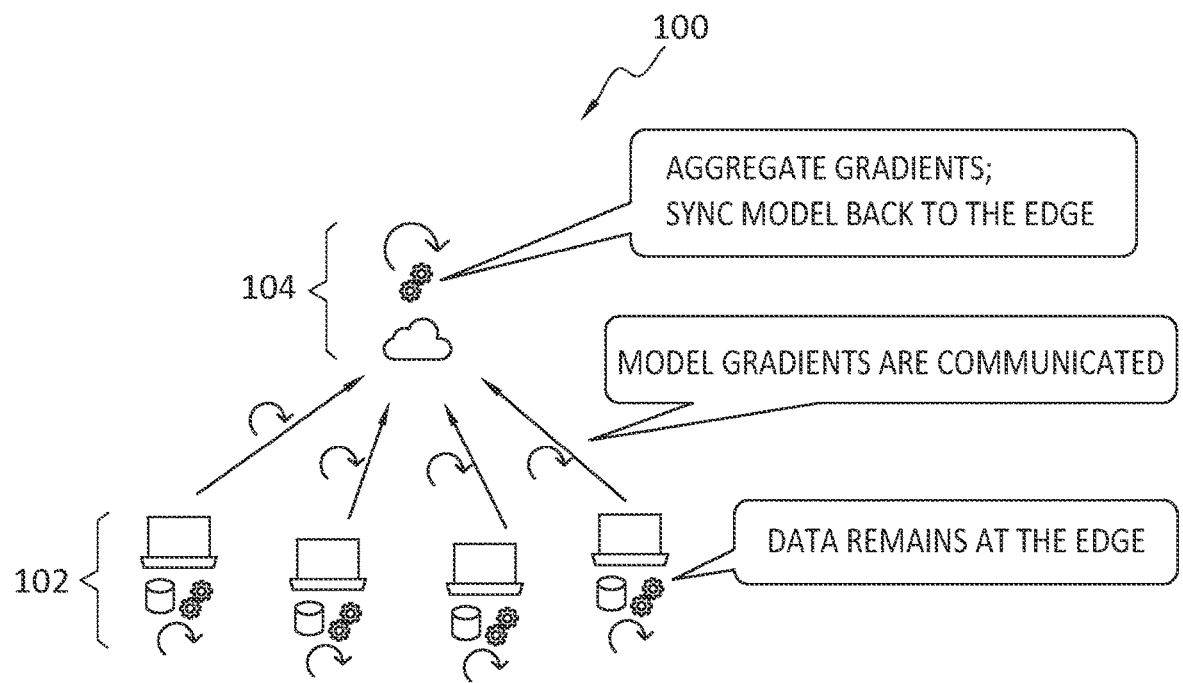
FIG. 1 discloses an overview of a federated learning process, according to some example embodiments.

Embodiments of the present invention generally relate to the logistics of managing operations in various environments. More particularly, at least some embodiments of the invention relate to systems, hardware, software, computer-readable media, and methods for using event detection as a basis for federated learning across multiple environments so as to control various operations in those environments, while remaining sensitive to associated data privacy concerns.

In general, example embodiments of the invention may involve the definition and implementation of a large-scale federated learning training process for event detection models, in an edge computing environment, in a cross-organization fashion. Aspects of some particular embodiments may be illustrated through the use of an example involving forklift operations in various warehouse environments. However, it should be understood that these examples are provided for illustrative purposes and are not intended to limit the scope of the invention in any way.

Example embodiments may be implemented in an environment that includes a central node, near-edge nodes, and edge nodes such as sensors. The group, or federation, of near-edge nodes may span multiple organizations such as multiple different companies, or multiple business units within a company. Initially, a model may be distributed to the edge nodes, which may each train the model using data collected by that edge node. The model may be a model that may employ sensor data from the collective organizations to predict behavior in a particular organization.

Differences between the model outputs and ground truths may be communicated by the edge nodes to the central node which may aggregate the differences from all the edge nodes to generate an updated version of the model which may then be communicated from the central node to the edge nodes. The edge nodes may or may not then train the updated model. This training cycle may be repeated any number of times, and the most up to date version of the model then communicated to the edge nodes.

Over time, model drift may occur, that is, the operation of an edge node may deviate, possibly significantly, from the training data that was used to train the model running at that edge node. Where drift occurs, it may be necessary to split the federation to define a group of federations that, collectively, better aggregate together those nodes whose respective model performance, whether good or drifted, is similar. In some cases, drift detection, and the resulting federation splits, may result in so many splits that the federations become overly fragmented. In such circumstances, multiple federations may be merged together, based upon the model performance over time in the nodes of those federations.

In this way, embodiments may continually seek an optimum, or at least improved, allocation of nodes among one or more federations, as well as continuous improvement to the model(s) deployed to the nodes. This allocation may be based on an ongoing monitoring of the performance of the model at those nodes. Because a federation may span multiple organizations, each of the organizations spanned by the federation may benefit from the detection of events at the other organizations, while data privacy for each organization is preserved at least as to material aspects of the data.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment of the invention may leverage event detection across multiple organizations to improve event prediction model improvement at each of the organizations. An embodiment may implement a federated learning process spanning multiple organizations while also preserving data privacy for those organizations. An embodiment may enable ongoing evaluation and redefinition of federations so as to better facilitate model improvements and performance. Various other advantages aspects of example embodiments will be apparent from this disclosures.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

In general, example embodiments of the invention relate to the usage of sensor data collected and processed at the edge, such as in warehouse environments, for example. Some example embodiments are directed to an approach that can be used for management and automation, for example, of forklift operations, particularly leveraging machine learned models. Embodiments may involve the application of machine learned models for event detection. Event detection may be important for automating, optimizing and assessing the environment, with implications for operations as well as auditing. Embodiments may consider edge environments, that is, edge computing environments, that comprise multiple edge nodes, and may also consider near-edge infrastructure.

To illustrate with the example of forklift operations in a warehouse, events of interest may comprise, for example, dangerous cornering, excessive load, dock-entering or -exiting, collisions, excessive mast height for heavy loads. More generally, such events may include all kinds of alarms that may be raised by real-time event monitoring systems. For many such events, it may be possible to obtain a prediction based on sensor data, but only later may a 'ground truth' be obtained, that is, an indication of whether a predicted event actually took place.

Example embodiments may employ federated learning techniques in this context. These techniques may provide data privacy for shared, or federated, training of models that may operate to predict the occurrence of events. Embodiments may orchestrate a federated learning process across different organizations, such as customers or business units for example, that may require data privacy, but would benefit from the improved model quality of generalized models trained in a distributed fashion. Example embodiments of the invention may combine these concepts. For example, some embodiments may define an event detection model training approach, which may leverage data across customers while also largely satisfies data privacy concerns. As well, embodiments may determine a mechanism to manage and periodically update which edge nodes, such as forklifts for example, are most appropriately trained in conjunction.

Thus, embodiments of the invention may include systems for leveraging event information to manage a cross-customer federated learning approach. Embodiments may provide a cross-customer continuous update of edge-side event detection models in warehouse, or other, environments via federated learning. Following is a brief discussion of three areas of particular interest as concerns some example embodiments of the invention.

A.1 Federated Learning

In federated learning (FL) approaches, the model training task may be performed by keeping data at each node, training the model locally at each node using training data generated by that node, and then communicating model updates, which may take the form of gradients, to a central node that will perform an aggregate update of the model based on the gradients received from the nodes. That is, the aggregation process performed at the central node may result in an updated model that is synced back to all nodes.

Attention is directed now to FIG. 1 which discloses an overview of a federated learning process implemented in an example operating environment 100 that includes one or more client, or edge, nodes 102, and a central node 104. Particularly, a simplified, but not limited, example of the operations that may be involved in the training of a Deep Neural Network (DNN) in an FL setting may operate as follows: (1) the client nodes 102 may download a current model from the central node 104—if this is the first cycle in a training process, the shared model may be randomly initialized; (2) next, each client node 102 may train the model using its local data, of the client node 102, during a user-defined number of epochs; (3) the model updates may be sent from the client nodes 102 to the central node 104—in some example embodiments of the invention, these updates may be vectors that contain the gradients, that is, that contain differences between the model that was received at the nodes 102 and the changes implemented to the model by the nodes 102 as a result of the training operation performed by the nodes 102; (4), the central node 104 may then aggregate these vectors and update the shared model—in some instances, aggregating the vectors may take the form of a simple averaging process, or federated average; (5) if the predefined number of training cycles N is reached, the training may finish—otherwise, the method may return to (1); (6) an FL process according to some embodiments may also consider implementation of a security layer around communication, but that is not necessarily required.

In general, an FL process may provide strong privacy-preserving guarantees since datasets are never communicated between nodes, which, in turn, reduces network communication by a significant fraction. Additional gradient compression techniques may be used to further reduce network costs, such as bandwidth and latency. Note that the gain privacy may be realized at the cost of the trade-off between compression and generalization in model update communication. Privacy concerns apply as typically in networked computer systems, with a need for a security layer when transmitting and aggregating gradients, for example, in order to avoid statistical leaks of information or possible attacks. Thus, some embodiments may strike a balance between privacy concerns on the one hand, and the effectiveness and efficiency of an FL process in terms of performance and network resources consumed.

A.2 Sensor Data Collection

Example embodiments may assume that data is collected at a near edge from edge sensors individually, such as sensors deployed at each forklift in a group of forklifts. In this illustrative example, each forklift may comprise several sensors and those sensors may collect, over time, multiple readings that an aggregator or other component of the forklift may combine together to create a combined sensor stream from the forklift. An example of this is shown in FIG. 2, which discloses that a collection of sensor readings Si collected by sensors 204 of a forklift Ez 206 is added to the near-edge Nz database 208 of sensor readings $\mathbb{S}$.

Figure 2:
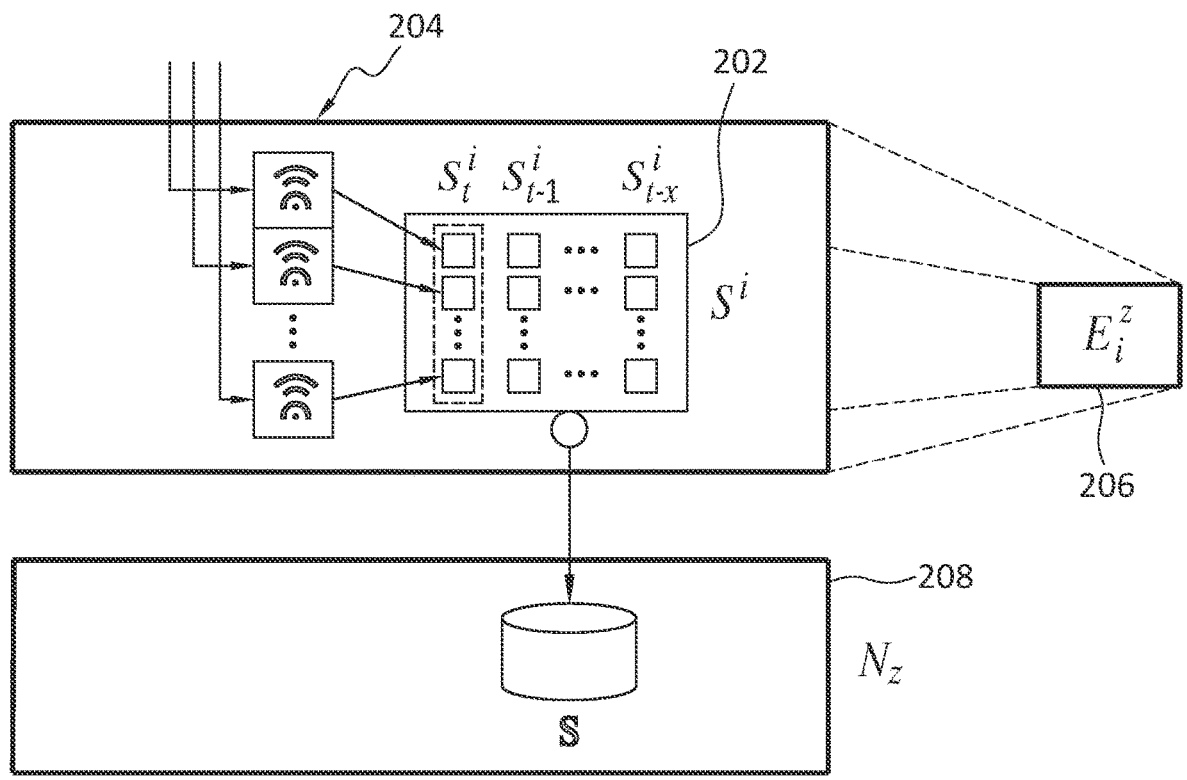
FIG. 2 discloses collection and storage of data, according to some example embodiments.

Particularly, FIG. 2 discloses distinct sensors 204 at forklift Ei 206 whose readings are aggregated into a sensor stream Si of collections $s^i(t)$, $s^i(t-1)$, $s^i(t-2)$, As depicted in FIG. 2, embodiments may assume that the collection of sensor readings can be correlated among the sensors 204. A collection may be triggered periodically, or by a change in values, for example, one collection every time an acceleration or deceleration of a forklift is observed, or a combination of both. The collection st is the most recent one at time instant t. In this context, example embodiments may assume at least x previous collections are stored within the edge node, such as a sensor for example.

Note that some collections may not contain valid readings for certain sensors. With reference to the forklift example, typical collections may comprise valid positioning data, such as GPS measurements for example, that can be mapped into the coordinates of an environment such as a warehouse. Typical additional information may include inertial measurements of acceleration and deceleration taken by an inertial measurement unit (IMU), as well as bearing and other kinds of rich movement tracking, such as forklift mast position (height), and load weight.

A.3 Model Training and Inference at the Edge

Figure 3:
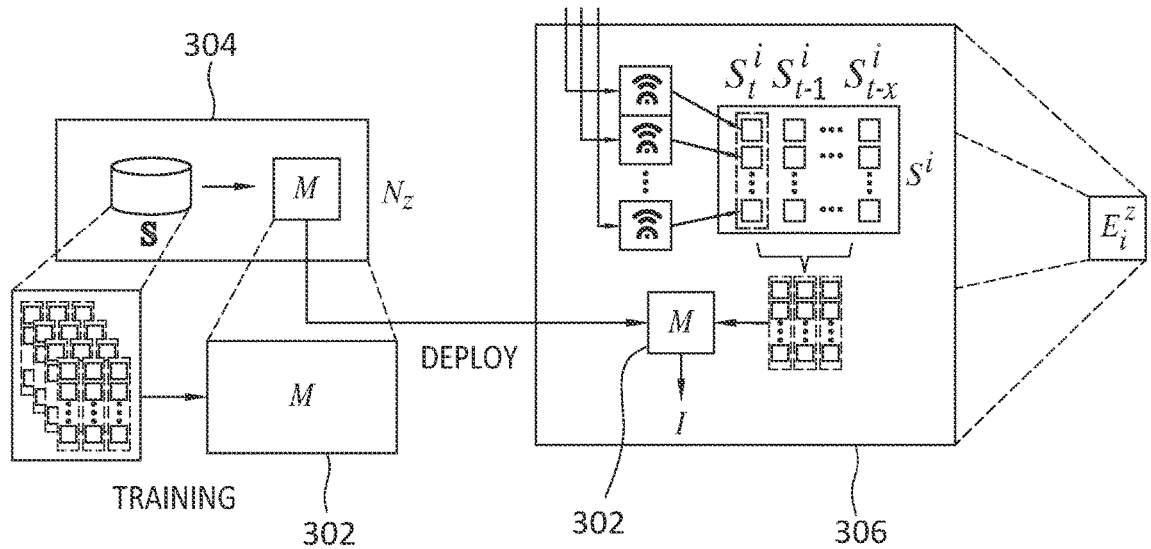
FIG. 3 discloses training of a machine learning (ML) model at a near-edge node, according to some example embodiments.

The data collections obtained by the sensors can be used at the forklift itself for decision making but may also be collected at the near edge. One approach for relying on machine learning may comprise the training of a model at the near edge. This is depicted in FIG. 3 which, in particular, discloses training of a machine learning model 302 at a near-edge node 304 and the deployment of the resulting model at the edge 306. The model M 302 obtained may then be deployed at each edge-node 306. Leveraging the sensor collections most recently collected, the inference I of the model M 302 may be used for decision making in a relatively fast manner. An application for such a model M 302 would be to perform event detection at the sensor. For example, the model M 302 may be trained to provide as inference I an indication of events of interest. Notice that several models may be trained and deployed in a similar fashion concurrently.

B. Particular Aspects of Some Example Embodiments

In general, example embodiments of the invention may embrace a large-scale federated learning training process for event detection models at the edge in a cross-organization fashion. Embodiments may assume that many edge nodes with similar operational capabilities and requirements are available, associated with several near-edge nodes. This disclosure describes, as one example illustrative embodiment and use case, the context of forklifts as far-edge nodes, associated with multiple near-edge nodes.

By exploiting a federated learning approach, embodiments may allow for edge-nodes of different organizations, such as company business units, customers, partners, and possibly competitors, to contribute towards better shared event-detection models for all, while also ensuring data privacy for each of the organizations. As well, embodiments may embrace a scheme to orchestrate multiple federations over time by leveraging event detection and drift detection algorithms. The edge nodes may operate in distinct operational states for which no general object detection model suffices. For example, a certain set of forklifts in each warehouse may operate distinctively, that is, differently, in loading/unloading of heavy cargo. These patterns of behaviors may be important for event detection.

B.1 Environment

Attention is directed now to various aspects of some example operating environments for embodiments of the invention. These examples are for illustrative purposes and are not intended to limit the scope of the invention in any way.

B.1.1 Central Node and Near-Edge Nodes

Figure 4:
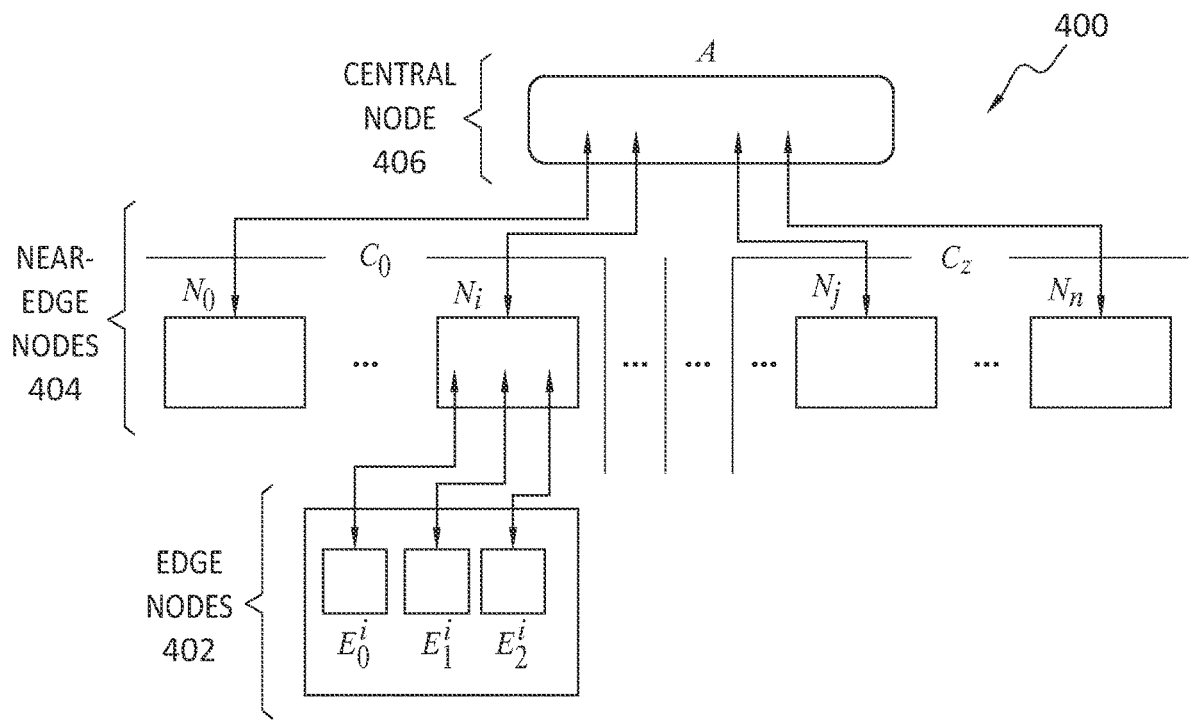
FIG. 4 discloses aspects of a cross-customer environment, according to some example embodiments.

In general, some example embodiments may be implemented in connection with the example operating environment 400 disclosed in FIG. 4 which indicates a cross-customer environment configuration that includes one or more edge nodes 402 associated to near-edge nodes 404 that, in turn, are associated with a central node 406. Each of the near-edge nodes 404 may be associated with, or be a part of, a different respective organization or other entity.

Particularly, FIG. 4 discloses how a central node A 406 communicates with several near-edge nodes 404 $N_0, \ldots,$ Nn. The central node A 406 may represent a large-scale computational environment with appropriate permissions and connections to the respective near-edge nodes 404 of various organizations. Some example embodiments may be implemented in a local infrastructure at a core company providing the federated orchestration disclosed herein as a service (FOaaS) and/or in partnership with other organizations.

B.1.2 Edge Nodes

In some embodiments, and as indicated in FIG. 4, each near-edge node 404, such as the near-edge node $N_i$, may be associated with several edge-nodes 402, such as the example edge nodes $E_i^0$, $E_i^1$, and $E_i^2$, embodiments may consider that the edge nodes 402 may contain multiple different models for event detection of various different events, and/or that a single model at an edge node 402 may be operable to deal with several different classes of events. In the interest of simplifying the discussion herein, the edge nodes 402 may be represented herein as containing a single model.

In practical applications, each near-edge node 404 may be associated with many edge nodes 402, such as hundreds, thousands, tens of thousands, or more, edge nodes. At least some embodiments may assume that the edge nodes 402 comprise sufficient computational resources for the iterative training of a neural network, as may be employed in a federated learning approach.

B.1.3 Organizations

It is noted further that FIG. 4 discloses the separation between two organizations, indicating that those organizations are separate entities that may be associated with different respective sets of edge nodes, models, and data privacy considerations, for example. Particularly, note the separate organizations $C_0$ and $C_1$. These organizations may represent, for example, two distinct companies or customers, or one of the core company business units. For the description of the method embodiments may assume that the near-edge nodes $N_0, \ldots,$ Nn 404 communicate directly to the central node A 406. This may not necessarily be the case in practice, with intermediate steps in the communications between the central node 406 and the near-edge nodes 404 depending on characteristics of the edge environments at each organization.

B.2 Federated Learning of Event Detection Models

As noted earlier herein, example embodiments may apply a federated learning approach, with the model training processed by the edge nodes across all near-edge nodes and the aggregation at a central node A. Thus, all edge nodes may train, and periodically update with global aggregated learning, a model $M_v^a$:
- a is a unique identifier of the federation of nodes whose data was used to train the model and/or who are deploying the model for event detection; and
- v is a version number (i.e. starting with zero) within the federated learning cycle for federation 'a'.

Figure 5:
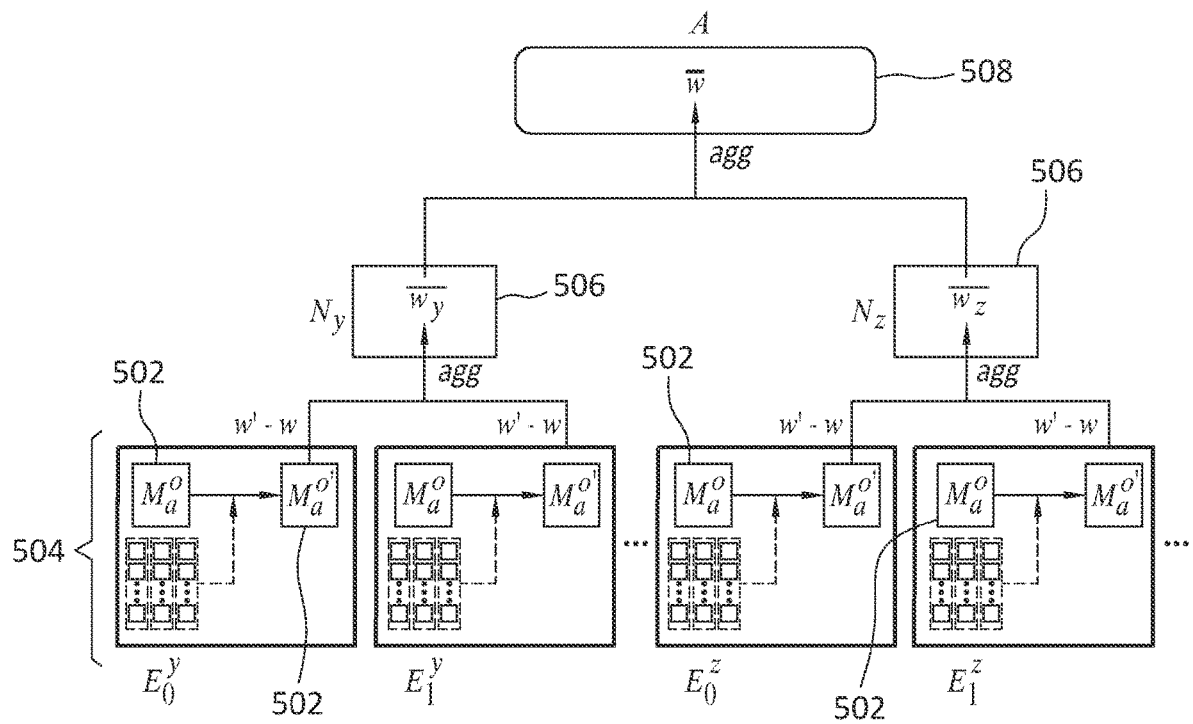
FIG. 5 discloses an initial operation of a cross-organization federated learning cycle, according to some example embodiments.

With reference now to the example of FIG. 5, a first process of a cross-organization federated training cycle is disclosed. Particularly, a model $M_a^0$ is disclosed that may be initially identically defined across all edge nodes 504. Each edge node 504, which may communicate with a near-edge node 506, may leverage its own local sensor data to train $M_a^{0'}$ for a number of epochs, ultimately communicating the pseudo-gradient of the learned weights differences to a central node 508. Mechanisms such as quantization and compression may be applied, by the edge nodes 504, to the resulting pseudo gradients w'-w before they are communicated by the edge node 504 to a near-edge node 506. One approach for greatly minimizing the communication costs is to apply a technique such as signSGD (the sign of the stochastic gradient vector) to communicate only the signs of the stochastic gradients from each edge node 504.

The communication from the edge node 504 may go through the near-edge 506 node with which the transmitting edge node 504 is associated, and the near-edge node 506 may or may not perform an aggregation step 'agg,' as shown in FIG. 5. If this intermediate aggregation is performed by the near-edge node 506, $\overline{wy}$ and $\overline{wz}$ may comprise an aggregated pseudo-gradient plus any additional metadata such as, for example, the count of models considered, necessary for further aggregation at the central node. Otherwise, $\overline{wy}$ and $\overline{wz}$ may comprise directly arrays of the values received from the edge nodes 502 to be passed as-is to the central node A 508.

Thus, regardless of intermediate aggregation at the near edge nodes, the central node A obtains over $\overline{wy}$ and $\overline{wz}, \ldots$ and performs an aggregation procedure. If an aggregation step was performed at the near edge nodes the metadata accompanying the aggregated values may be considered. These aggregation(s) may be as typically performed in federated learning approaches, for example, a majority voting scheme.

Figure 6:
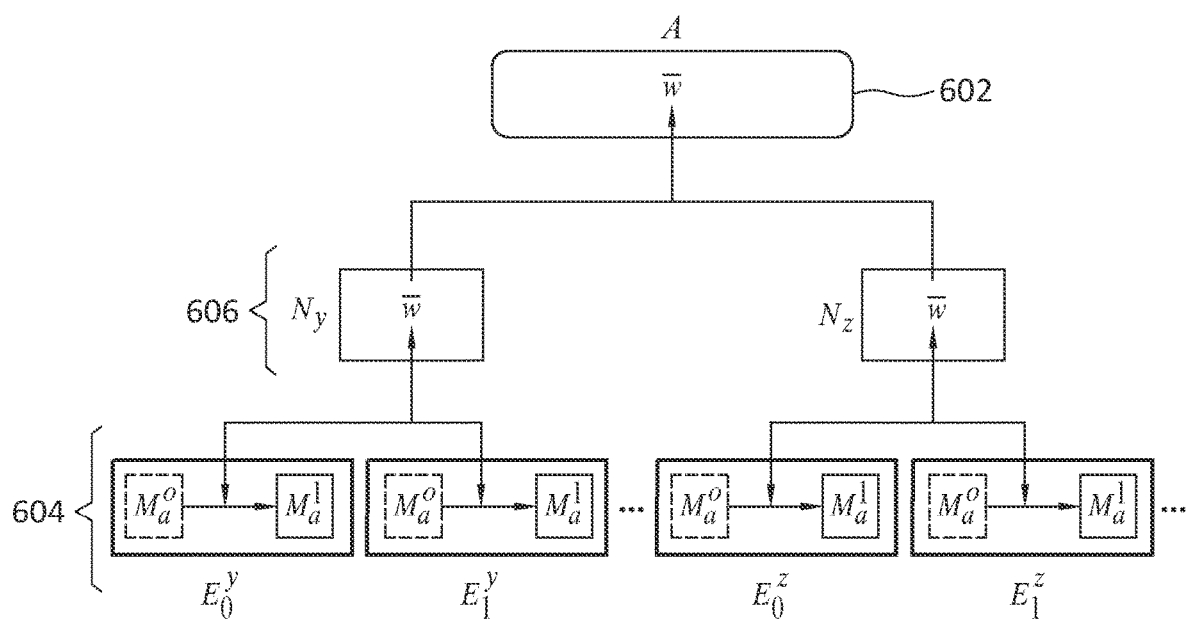
FIG. 6 discloses an second operation of a cross-organization federated learning cycle, according to some example embodiments.

Turning next to the example of FIG. 6, a second process of a cross-organization federated training cycle is disclosed. In this second process, the central node 602 may communicate the resulting gradients, that is the gradients generated by the aggregation process performed by the central node 602, back to the edge nodes 604, by way of the near-edge nodes 606. The application of such weights to model $M_a^0$ may result in model $M_a^1$ which, again, may be identically defined across all the edge nodes 604. This second operation is shown in FIG. 6 which indicates the second operation on a cycle of the federated learning training cross-organization according to some example embodiments. The training process may repeat as such for many cycles, as typical in federated learning.

After a predetermined number of training cycles have completed, the resulting most-updated model $M_a^v$, where v denotes the most updated version of the model, may be deployed to the edge nodes 604 for inference. Since the models may be trained at the edge nodes 604, this deployment may simply comprise a signal from the central node 602 to the edge nodes 604 that the models are fit for domain application, and the edge nodes 604 may begin using the models. For example, a signal may be broadcast from the central node 602 across all edge nodes 604 and the model $M_a^v$, where v is the most current version of the model, may be independently used for event detection at the edge nodes 604 in near real-time after the broadcast. Appropriate local orchestration at the edge nodes 604 may be implemented.

Alternatively, the model $M_a^v$ may be deployed based on an assessment of its global quality. The near-edge nodes 606 may leverage some of the collected sensor stream data (see FIG. 2) and a local copy of model $M_a^v$ to perform an assessment of the quality of the model. A resulting quality score computed at the near-edge node(s) 606 may be communicated to the central node 608 that determines whether the model is globally appropriate for deployment. The assessment of the quality of the model may be based on comparison of the predicated events to the known ground truths.

B.3 Monitoring

B.3.1 Federation Identification Tracking

Example embodiments of federation identification tracking may start in the fashion described above. Example embodiments may, however, determine, based on drift detection mechanisms, that certain edge nodes should split into separate federations, or groupings, of edge nodes, regarding model M, over time. After a federation split, for example, some edge nodes, which may be spread across different organizations, and therefore linked to different near-edge nodes, may operate with model $M_a^v$, while the edge nodes that were split off into a new federation may from then on, that is, after the split, operate on a different model, namely, model $M_b^w$.

Hence, in order to track which edge nodes belong to each federation (a, b, . . . ), and which may be collectively training and/or deploying each version of a model M, example embodiments may employ a structure $\mathbb{E}$. This structure may be separately held at the near-edge nodes, tracking and associating edge nodes to a unique identifier of the federation of nodes.

Figure 7:
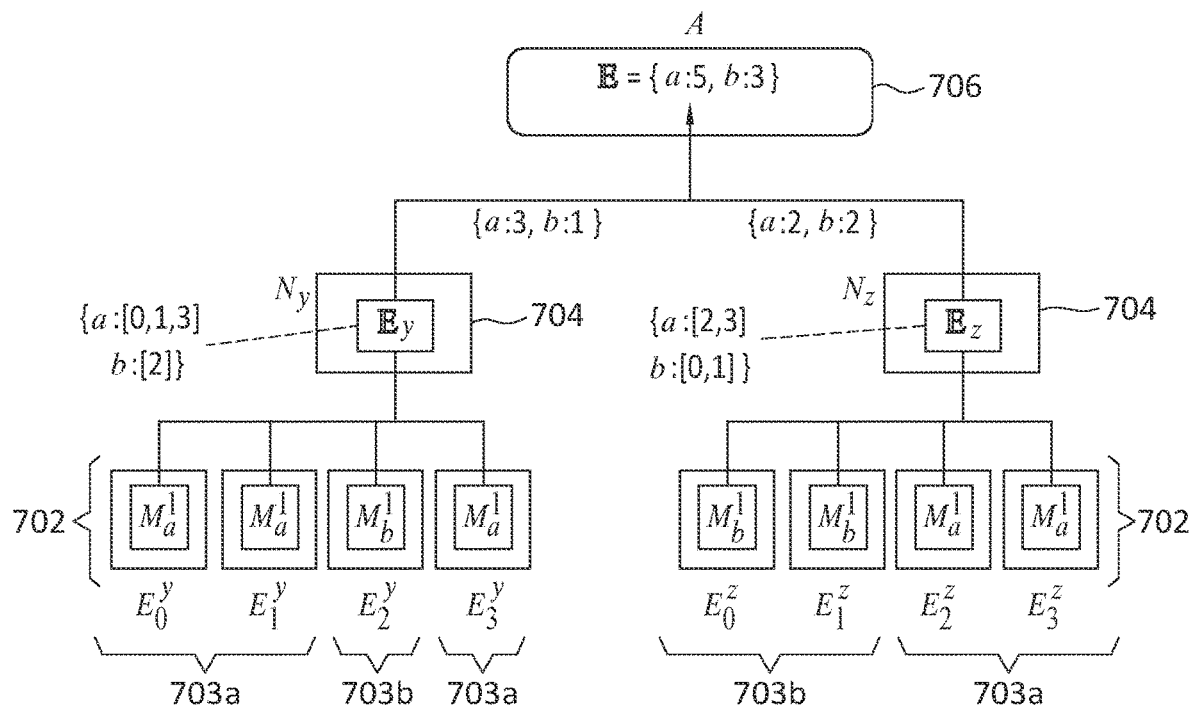
FIG. 7 discloses an example of the tracking of a federation ID for edge nodes in different near-edge nodes, according to some example embodiments.

With attention now to FIG. 7, there is disclosed an example of the tracking of the federation ID for the edge nodes 702 in different near-edge nodes 704, and the count of edge nodes 702 belonging to each federation 703a and 703b tracked at a central node 706. As shown in FIG. 7, each near-edge node 704 may keep such a structure $\mathbb{E}$. It may be that only the number of edge nodes 702 belonging to each federation 703a or 703b in each organization, or each near-edge node 704, are communicated to the central node 706, and aggregated as the structure $\mathbb{E}$. This approach may comprise a slight, but not material, relaxation of the privacy guarantees of traditional federated learning, but this may not be of significant concern as only the number of edge nodes may, potentially, be discoverable by external entities. Embodiments may provide that the number of edge nodes 702 is attributed to any particular organization, so as to preserve anonymity of the organization even if the number of nodes associated with that organization were to become known. It is noted that the structure $\mathbb{E}$ may also be extended to represent the status of models at the edge nodes 702 regarding drift detection.

B.3.2 Event Occurrences

Embodiments may expand on the definition of the environment described earlier herein to account for the collection of the indications of event occurrences. These occurrences may be obtained via domain-specific approaches, relying on domain expert input, auto labeling approaches, or additional models. In the first case, that is, leveraging domain knowledge, the occurrences may comprise the ground truth of the event detection model M operating at each edge node, that is, the known occurrences. These may comprise the actual events. For example, in the case of dangerous cornering detection, an occurrence may comprise a confirmation that a particular cornering event involving a forklift was indeed dangerous.

In the other cases, embodiments may emphasize that the model M operating at an edge node, and providing inferences of events that may be inaccurate, is still necessary. Recall that embodiments may determine model M to operate based on locally available sensor data, at the edge node. This may provide extremely fast inferences and enables real-time decision making. This approach does not preclude, however, that with more data, which may be collected at the edge node and/or elsewhere, another model could obtain a more accurate representation of the events.

For example, with respect to dangerous cornering detection, a model that considers a sensor fusion approach of RFID data from other entities in the domain, plus video frames from a set of monitoring camera feeds, may likely obtain a more accurate inference of dangerous cornering via, possibly more costly, object detection and proximity calculation approaches. In this illustrative case, this alternative model may operate on the near-edge, which may collect the data from the forklift as well as the other entities, adding a delay of communication to the decision making.

However, in the absence of any approach for determining ground truths, the predictions of the models M at the edge nodes can be used instead. Recall that in some embodiments at least, the edge nodes may contain multiple models—in this case, the predictions made by the models may be used as basis for the occurrences selectively. Regardless of the approach employed however, embodiments may denote the indication of events as occurrences, and may represent their relative frequencies at edge nodes. Each edge node may composes $Q=([q0, q1, \ldots])$ where $q_i$ is the indication of the occurrences of the ith event in the domain. The indications may comprise a count of the occurrences of the event at the edge node. It is noted that the frequency of the events may be computed as a function of the count of an event. That is, for example, $qi=(count(i)/\Sigma_j^{abs(q)} count(j))$ may indicate the relative frequency of event i with respect to all events considered.

Alternatively, if metadata related to time between collections is available, the edge nodes may also maintain a record of the elapsed time since the occurrences started to be counted (or from the last communicated collection, see below). Then $q^t$ may be computed to indicate the frequency of the event with respect to a time delta between collections. In the simplest configuration, however, the indication of event occurrence may comprise the total count directly.

Figure 8:
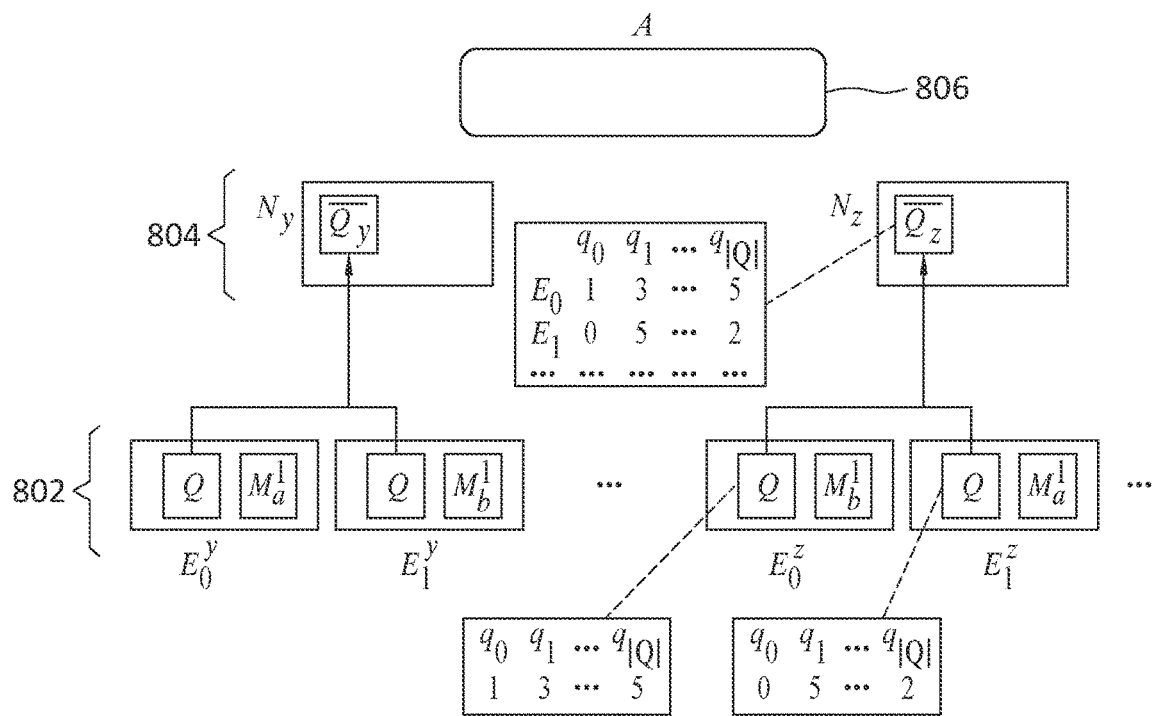
FIG. 8 discloses the collection, and aggregation, of event occurrence indications, according to some example embodiments.

Each edge node may periodically, asynchronously, communicate Q to the near-edge, which may then assemble a matrix $\overline{Q_E} \times |q|$ containing the event occurrences of the |q| events at each near-edge node E associated to it. This is shown in FIG. 8. In particular, FIG. 8 discloses a collection of event occurrences indications, exemplified in FIG. 8 by event counts, from the edge nodes 802 to the near-edge nodes 804, and the aggregation at the central node 806. Particularly, FIG. 8 discloses how the local, that is, at the edge nodes 802, event occurrences are aggregated at the near-edge 804.

The edge nodes may also maintain a record of the elapsed time since the occurrences started to be counted, or from the last communicated collection, and may communicate that time along with Q to the near edge-node 804. In a straightforward implementation, all edge nodes 802 linked to a near-edge node 804 may be polled in a same periodical fashion and this indication of time could be implicit and, hence, not communicated, as it may be implied at the near-edge node 804 by the polling frequency. The time indication may be useful for computing a time-relative frequency. The example of FIG. 8 represents the counts of events, rather than a frequency of the occurrence of events.

B.3.3 Federation Event Profiles

Figure 9:
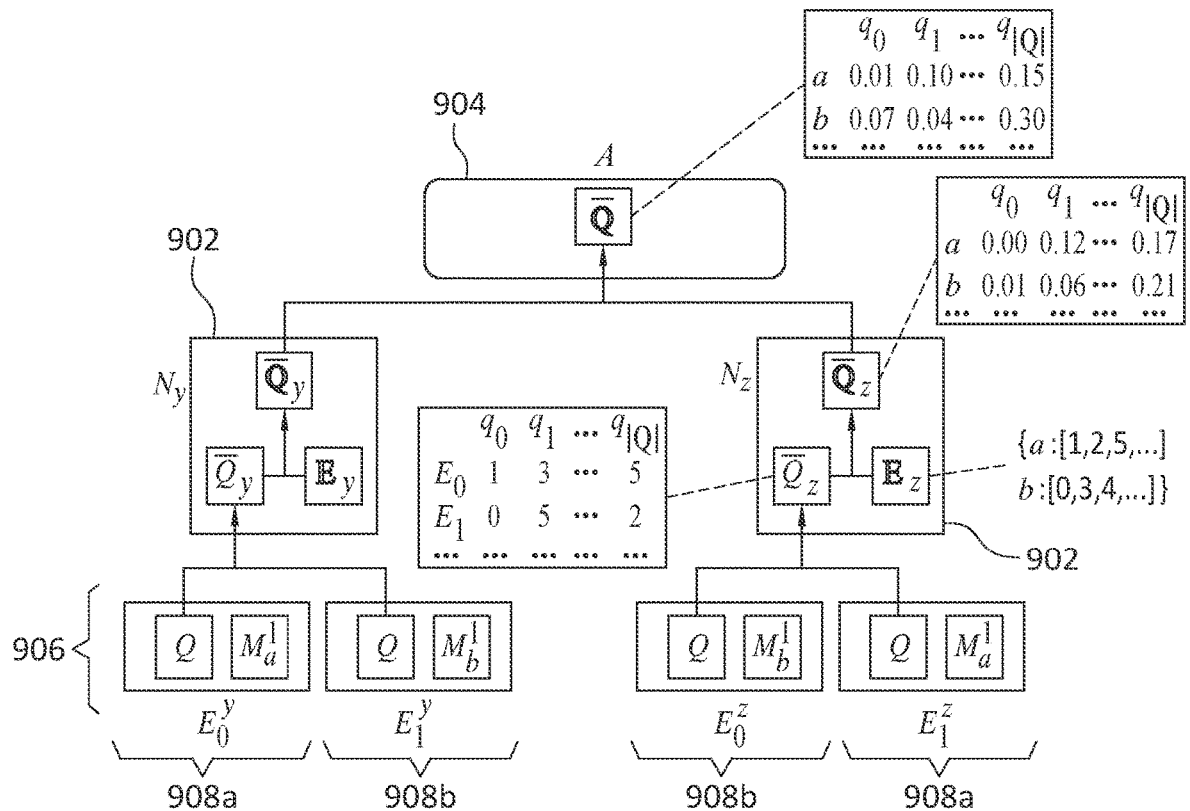
FIG. 9 discloses the computation of federated event relative frequencies, according to some example embodiments.

By relating $\overline{Q_{E \times |q|}}$ and $\mathbb{E}$, the near-edge nodes may be able to compute a matrix of the frequency of events for the nodes belonging to each federation. This process is disclosed in FIG. 9 which discloses, in particular, the computation of the federation-event relative frequencies $\overline{Q}y$, $\overline{Q}z$, ... at the near-edge nodes 902 and the aggregation of the federation-event profiles $\overline{Q}$ at the central node 904. As shown, these computations may be based on the respective Q received by the near-edge nodes 902 from the edge nodes 906, which may be organized into the federations 908a and 908b.

The federation-event frequencies may result from an aggregation step at the near-edge nodes 902. The aggregation step may depend on the representation of event occurrences within $\overline{Q_{E \times |q|}}$, but may be straightforward and apparent. Information indicating the time between collections may be used to compute a time-relative frequency. In that sense, as in FIG. 9, the structures $\overline{Q}y$, $\overline{Q}z$ ... may semantically represent how likely the nodes belonging to a federation are to observe an event of a certain type in a predetermined time period. Alternative representations of $\overline{Q}$ may apply depending on the nature of the domain. For example, if the number of occurrences of events is important in the domain, $\overline{Q}$ may instead comprise a straightforward histogram of the expected number of occurrences of an event for a time period.

Regardless of the representation that is adopted, the federation-event frequencies at the near-edge nodes 902 may be communicated to the central node 904, where they may be aggregated into a structure $\overline{Q}$ that may be referred to herein as the 'federation-event profiles.' This structure $\overline{Q}$ may be leveraged for the merging of federations, as described hereafter.

The information of the number of edge nodes belonging to a federation, and the federation-event frequencies, may thus be shared across organizations. This may be a slight departure from the fully anonymous and separate process of other federated learning approaches. However, the sharing of these non-attributional bits of information across organizations may make the training and deployment of models more efficient, while presenting minimal, or no, risk of running afoul of privacy requirements that may apply to the data of an organization.

B.3.4 Drift Detection

With model M deployed at the edge nodes, it is possible to perform an analysis of model drift. Traditional approaches to drift analysis may rely on the comparison of the inferences obtained by the model against a ground truth, and the comparison of accuracy error over time may determine whether the model is drifting. At lease some embodiments may assume that a given near-edge node will, eventually and over time, collect an indication of which edge nodes linked to that near-edge node are drifted. A representation of this process is disclosed in FIG. 10.

Figure 10:
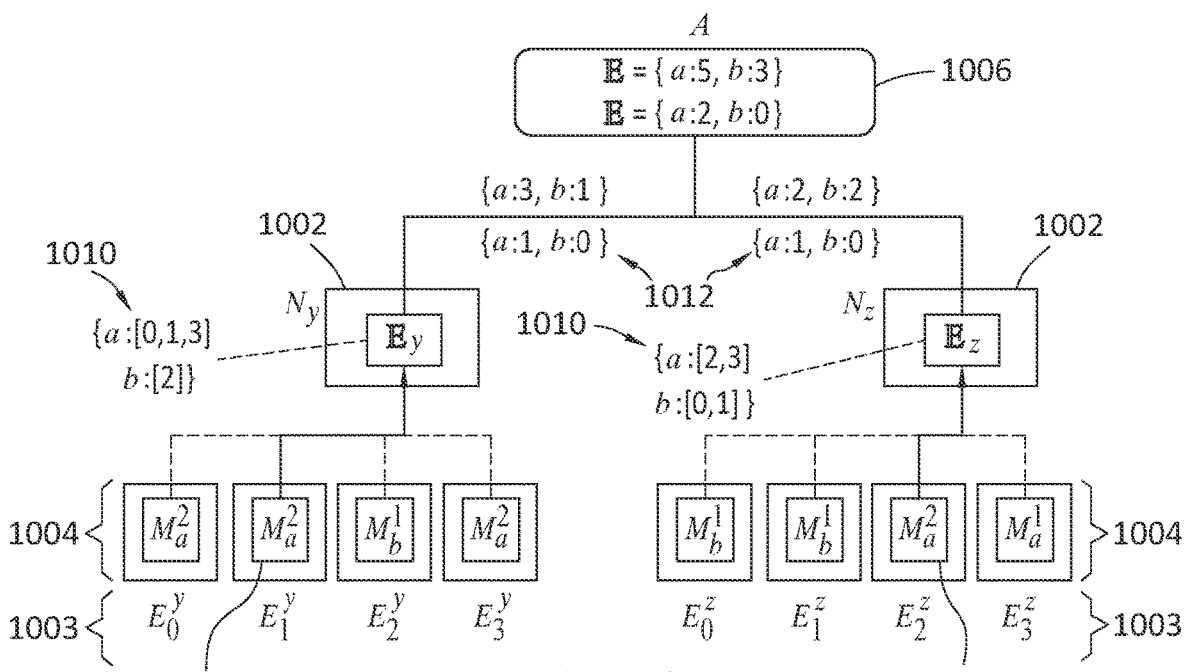
FIG. 10 discloses a representation of drift signal as communicated and aggregated, according to some example embodiments.

Particularly, FIG. 10 discloses a representation of drift signals accounted for at the near-edge nodes 1002, related to the federation IDs to which the drifted models belong, where the drift signals 1003 are communicated, by the edge nodes 1004 to and aggregated as $\mathbb{E}$ at the near-edge nodes 1002 and/or the central node A 1006. In the example of FIG. 10, the drifted/drifting models M are denoted at 1008. This means that upon monitoring and inspection, the nodes $E_1^y$ and $E_2^z$ are both signaled to have experienced model drift with respect to the model Ma, at that point in the federated learning cycle. This information may be appended to the structures $\mathbb{E}y$, $\mathbb{E}z$, ..., represented in FIG. 10 by a highlighted node IDs 1010.

The communication of the federated identification tracking from the near-edge nodes 1002 to the central node 1006 may likewise be expanded to also include a count of the number of drifted edge nodes, with respect to model M. This is also represented in Figure at 1012. Those counts may similarly be aggregated at the central node 1005 in a structure $\mathbb{E}$.

It is noted that a mechanism for drift detection may vary depending on the domain and the available data. The collection of actual event occurrences as ground truths, typically at the near edge, may be used for that purpose. The near-edge nodes may identify, using the ground truths, which edge node models errors are above a predetermined threshold and flag those models as drifted.

Other mechanisms for drift detection may be applied. Certain approaches can be applied at the edge-node without the need for ground truths or labeled data. For at least some embodiments, it is not necessary that drift detection happen anywhere close to real time, but the delay between drift and the identification of the drift should not typically exceed more than a few of the federated learning cycles. A discussion of how the drift indications collected at the near-edge and the drift counts per federation collected at the central node can be used to determine the splitting of federations follows hereafter.

B.4 Federation Splitting

As a result of the monitoring disclosed above, embodiments may be able to relate the identification of drifted nodes to the federations that those nodes currently belong to, that is, the federations to which the nodes with drifted models belong. Thus, embodiments may then perform a periodic verification of the number of drifted nodes for each federation and use the number of drifted nodes to determine whether or not a federation should be split. In brief, the drifted nodes may be separated from their current federation and combined into a new federation, and a new specialized model obtained for those nodes.

Given a predetermined minimum number of edge node members for a federation k we determine, for each federation id i that it must be split iff $\mathbb{E}[i] \geq k$. Following the example of FIG. 10, and assuming a threshold k=2, a decision for splitting federation a is disclosed in FIG. 11. In particular, FIG. 11 discloses a decision to split federation a due to a higher-than-k number of drifted edge nodes in that federation. A new model $M_0^c$ may then be initialized for the newly-formed federation c. Not depicted in FIG. 11 is the updating of structures $\mathbb{E}$ and $\mathbb{E}$ at the central node, which may take place in a following monitoring step that is shown in FIG. 12.

Figure 11:
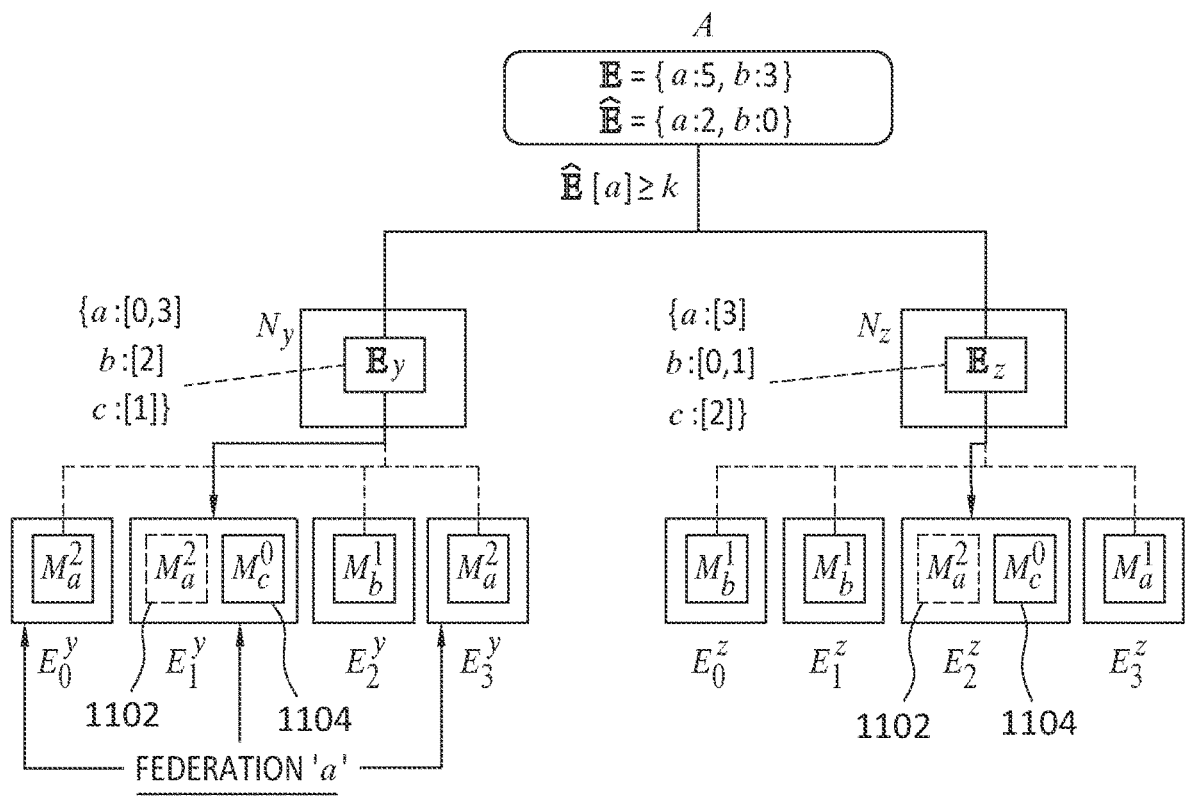
FIG. 11 discloses aspects of a federation splitting process, according to some example embodiments.
Figure 12:
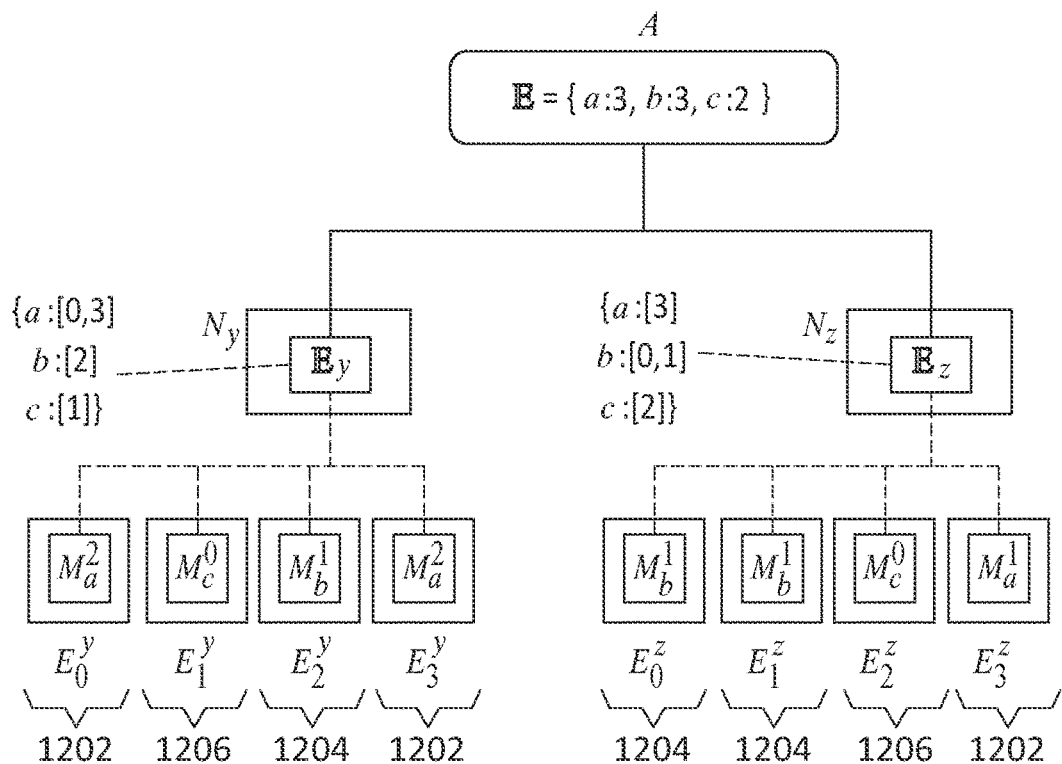
FIG. 12 discloses a state of cross-organization federations, according to some example embodiments.

In FIG. 11, the model $M_a^2$ may still be kept at the drifted nodes $E_1^y$ and $E_2^z$ for inference, if that is desirable in the domain, but a new model $M_0^c$ may replace that model $M_a^2$ for future iterations of the federated learning process. The federated learning process with the new model may perform similarly to that described for the initial federation.

Note that the assignment of drifted nodes $E_1^y$ and $E_2^z$ to a new federation c may from then on be tracked at structures $\mathbb{E}y$ and $\mathbb{E}z$. The remaining nodes in federation a, namely, $E_0^y$ and $E_3^y$, may continue to operate and to perform the federated learning process described elsewhere herein, without any changes. Thus, the training of the aforementioned drifted nodes that left the federation a need no longer be considered for the update of model $M_a^2$ to $M_a^3$.

The splitting of federations may more accurately represent the changes in modes of operation of a model at different customers. It may be the case that a new federation is generated solely within the scope of a single organization, for example, a single near-edge node in the example of FIG. 11. Regardless, embodiments may keep the orchestration of the federations cross-organizations due to the fact that, eventually, two federations can be merged together if the modes of operations of the edge nodes belonging to both are deemed similar. Example embodiments of such a mechanism are described hereafter.

Finally, note that in the example of FIG. 11, there is represented a small number of edge nodes for only two near-edge nodes, and hence a very low value of k. In typical applications however, the number of edge nodes may be vastly larger, such as hundreds, thousands, tens of thousands, or more, and the threshold of the minimum number of drifted nodes to start a new federation may be significantly higher as well. Thus, the example of FIG. 11 is presented for the purposes of illustration and may be considered as a highly simplified representation of a significantly more complex, and larger, real world configuration.

B.5 Federation Merging

As noted earlier herein, embodiments may implement federation splitting in some circumstances. As well, embodiments may also implement federation merging in some circumstances. The disclosed mechanisms for the ongoing evaluation and updating of a model deployed at edge nodes may be applied over time in stable fashion, with few federations. However, in certain cases, the drift detection approach may progressively cause the splitting of federations to a point that the federations become too fragmented. For example, at some point, two sets of edge nodes may contain nodes that are operating in a similar state. Thus, while the two sets, or federations, could be performing the federated learning process as a single federation, they are not because they had previously drifted and the federations were split. Thus, embodiments may provide a mechanism for the merging of federations.

A merging of federations may tend towards a larger federation, dealing with a more general, and more widely applicable, model. A naïve approach for the merging of federations could comprise a cross-testing of all models a, b, c, . . . at a sample portion, such as one or more edge nodes, of all other federations. In this approach, model a may, for example, be deployed to one or more edge nodes belonging to each of federations b, c, . . . , model b may likewise be deployed to one or mode edge nodes belonging to each of federations a, c, . . . . The results of these cross-deployed models a and b could then be collected and compared to the results obtained by the actual model operating at the nodes to which the other models a and b were cross-deployed. If the cross-deployed model substantially and consistently outperforms the actual model, that may be an indication that the federations should be merged.

Such an approach may present several disadvantages, however. For example, the edge nodes selected to cross-test other model(s) incur in additional processing and communication costs, which may not be feasible and is not ideal; particularly in domains with constraints on energy consumption or other resources at the far edge. Another possible disadvantage is that potentially delayed decision making may be experienced at the far edge, as a determination of which edge nodes should be selected to deploy each model may not be trivial and may need to consider environmental and/or contextual factors of the operation of the edge node. Finally, this approach may be associated with a high orchestration cost, as the central node should ensure that all models are sufficiently deployed at all organizations—if a near-edge node Ny does not contain any edge nodes belonging to a federation a, the respective model may need to be stored at Ny regardless so it can be deployed at one or more edge nodes related to Ny.

Given this background, example embodiments of the invention may instead determine, and implement, a heuristic method to avoid having to cross-test models at different edge nodes. In general, such embodiments may leverage the disclosed mechanisms for drift detection and the structure of federation-event profiles collected as part of the processes for federated learning of event detection models and monitoring. One example embodiment of such a method may comprise the following operations: (1) monitor the number of edge node member of each federation in $\mathbb{E}$; (2) identify a federation i with a smallest number of members, below a predetermined threshold $h_{low}$; (3) compare the federation-event profiles of that federation to that of a federation j with a maximum number of members, above a predetermined threshold $h_{high}$; (4) upon detecting a similarity in the federation-event profiles, promote the merging of the federations i and j.

Typically, the values of $h_{low}$ and $h_{high}$ may be set in conformance with the value of threshold k used to determine the splitting of federations. It may be the case that $h_{low}$=k, for some embodiments.

An algorithm that embodies the example operations (1)-(4) noted above may take the following form:

```
MergeIter( 𝔼, ℚ, r):
... for i in 𝔼:
... ... if 𝔼[i] ≥ hlow; continue
... ... else:
... ... ... for j in 𝔼 − {i}:
... ... ... ... if 𝔼[j] ≤ hhigh; continue
... ... ... ... else:
... ... ... ... ... mindiff ← r
... ... ... ... ... best ← null
... ... ... ... ... if diff(i, j) < mindiff:
... ... ... ... ... ... mindiff ← diff( ℚ[i], ℚ[j])
... ... ... ... ... ... best ← j
... ... ... if best ≠ null:
... ... ... ... merge(i, j)
... ... ... ... return
```

This algorithm may iterate across the known federations and stops upon determining that a federation i and j are to be merged. It relies on a computed difference between the federation-event profiles of the federations being minimal. Notice that the algorithm above may not attempt to merge any two federations if the criteria are not met.

The algorithm may consider two federations as being similar upon determining that a difference diff (i,j) is the smallest, or at least smaller than a predetermined argument r. The implementation of diff may depend on the definition of the contents of structure ℚ. Typically, if the structure represents the relative frequencies of the events at the edge nodes in each federation, a score may be computed as the L1 norm of the row-arrays a and b in ℚ. If ℚ comprises the counts of events over a period of time, this score may be computed as a mean absolute error of the element-wise comparisons. Other kinds of scores may be appropriate for these or other kinds of federation-event profiles. The algorithm may ultimately determine that a procedure for enacting the merging of two federations will be invoked.

The implementation of the procedure merge, as embodied at least in part by the aforementioned algorithm, may additionally, that is, in addition to the operations (1)-(4) noted above, comprise: (5) deploying the latest version v of model $M^v$ (the largest federation) to the edge nodes in federation i—this may minimize the number of edge nodes that require a model deployment; and, (6) assigning nodes of federation i to, from then on, participate on federation j. This may involve updating the structures in $\mathbb{E}$, and $\mathbb{E}_y$, $\mathbb{E}_z$, . . . , as well as ℚy, ℚz, . . . in near-edge nodes $N_y$, $N_z$, . . . .

In the algorithm (above), embodiments may not exploit trivial optimizations such as storing the results of diff(i,j) to avoid calling it twice, or iterating over sorted $\mathbb{E}$. In the latter case, embodiments may iterate from smallest to largest value to determine i, attempting smaller federations first and stopping the algorithm altogether when encountering a first federation with a larger number of members than $h_{low}$. A similar optimization could betrivially performed for the inner loop by iterating over a sorted $\mathbb{E}$ in descending fashion, such that larger federations are considered first, and likewise breaking the loop upon encountering a first federation smaller than $h_{high}$.

Notice also that embodiments may not allow for multiple merges, and may instead stop upon determining that a pair of federations i, j should be merged. The algorithm may be expanded to account for multiple merges, but that would require additional control structures to forbid three-way merges. For simplicity of explanation, it may be assumed that, in some embodiments, only two federations will be merged at each iteration of a merge method.

Figure 13:
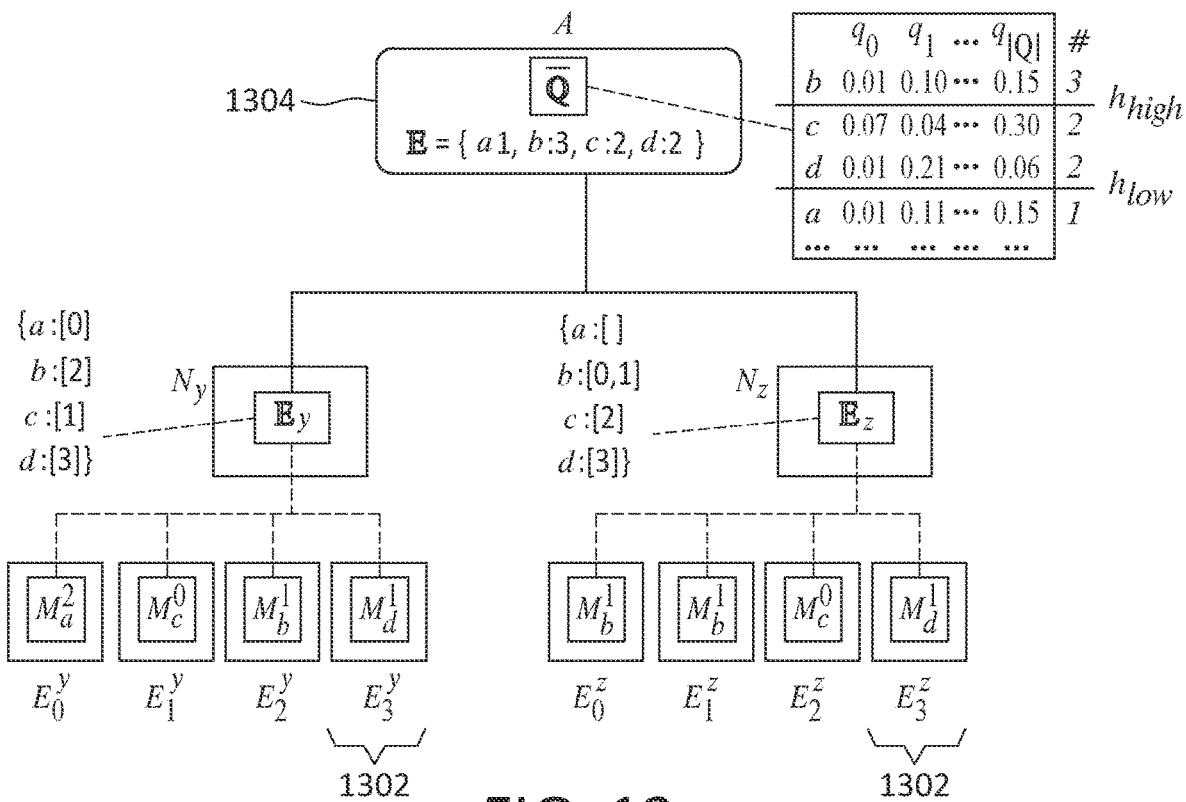
FIG. 13 discloses another state of cross-organization federations after a further federation split, according to some example embodiments.

As an example of the method described, consideration is now given to the example of FIG. 12, which discloses a state of the cross-organization federations a 1202, b 1204, and c 1206. Assume, for example, that federation a 1202 is further split once more, resulting in a new state of the cross-organization federations as depicted in FIG. 13, which includes a new federation d 1302 that spans the organizations Ny and Nz. FIG. 13 also represents the resulting federation-event profiles structure ℚ at the central node A 1304. Particularly, FIG. 13 discloses a second state of the cross-organization federated learning after an additional splitting of federation a. The resulting federation-event profiles after additional monitoring is shown.

FIG. 13 shows the federation-event profiles collected at the central node 1304 ordered by the number of nodes belonging to the federation, obtained from $\mathbb{E}$, Also depicted in FIG. 13 are the thresholds $h_{low}=h_{high}=2$. In the example, because federation a is below the threshold $h_{low}$, it may be compared to all federations above $h_{high}$ (in this case, only b). In this example, the difference diff([0.01, 0.11, . . . , 0.17], [0.01, 0.10, . . . , 0.17]) between the row-array ℚ[a] and ℚ[b], respectively, is smaller than the parametrized value of r. Hence, the two federations a and b are merged and the algorithm terminates.

Figure 14:
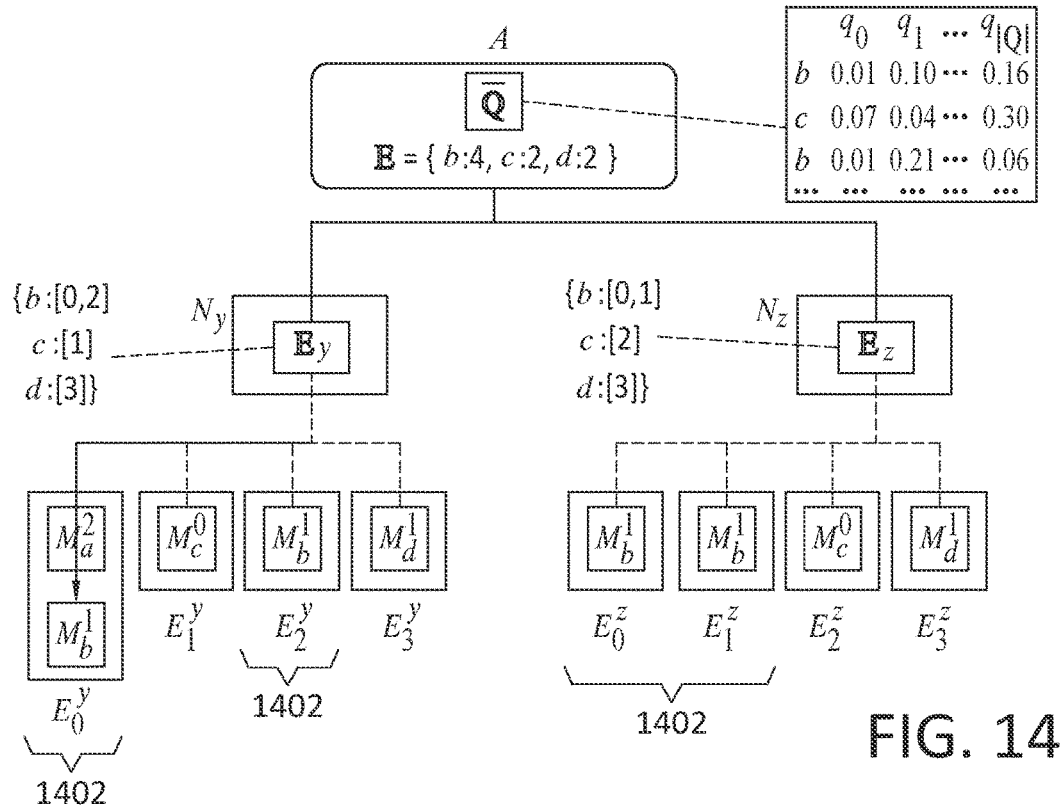
FIG. 14 discloses aspects of a federation merger, according to some example embodiments.

A result of the merging of a and b in the example of FIG. 13 would result in the state of the federations disclosed in FIG. 14, after additional monitoring updates the federation-event profile of the resulting, enlarged, federation b 1402. As a result, federation b incorporates the edge nodes previously assigned to a, in the example of FIG. 14, this would be only $E_0^y$. Those edge nodes from then on may operate with the latest version of the model for the federation b, and participate in the further training of the federated learning cycles as disclosed elsewhere herein.

C. Further Discussion

As will be apparent from this disclosure, example embodiments of the invention may possess a variety of useful features. For example, embodiments may provide for the application of federated learning adapted for model deployment with continuous update in cross-customer edge domains. In one illustrative example, and embodiment focuses on an application to the warehouse domain, where models are related to event detection tasks such as, for example, detection of dangerous cornering and other operational events in forklifts. Some embodiments may implement cross-organization federated learning for event detection models. Particularly, such embodiments may define a specific framework for the federated learning of event detection models in scenarios with multiple near-edge nodes with independent sets of associated edge nodes. As another example, some embodiments may implement drift detection and event monitoring. Particularly, such embodiments may define how the framework includes and leverages approaches for drift detection and monitoring of event occurrences at the edge nodes over time, while also embracing methods for aggregation, communication and storage of relevant data. This data may ultimately used for the dynamic management of models and federations and may includes the assembling of auxiliary data structures. Finally, some embodiments may implement dynamic management of cross-organization federated learning based on federation-event profiles. Particularly, such embodiments may embrace methods for splitting, and merging, federations, and the related orchestration for the management of models in consequence of changes in the shared federations. The drift indications and the federation-event profiles resulting from the monitoring steps may be leveraged to determine the splitting and merging of federations.

D. Example Methods

Figure 15:
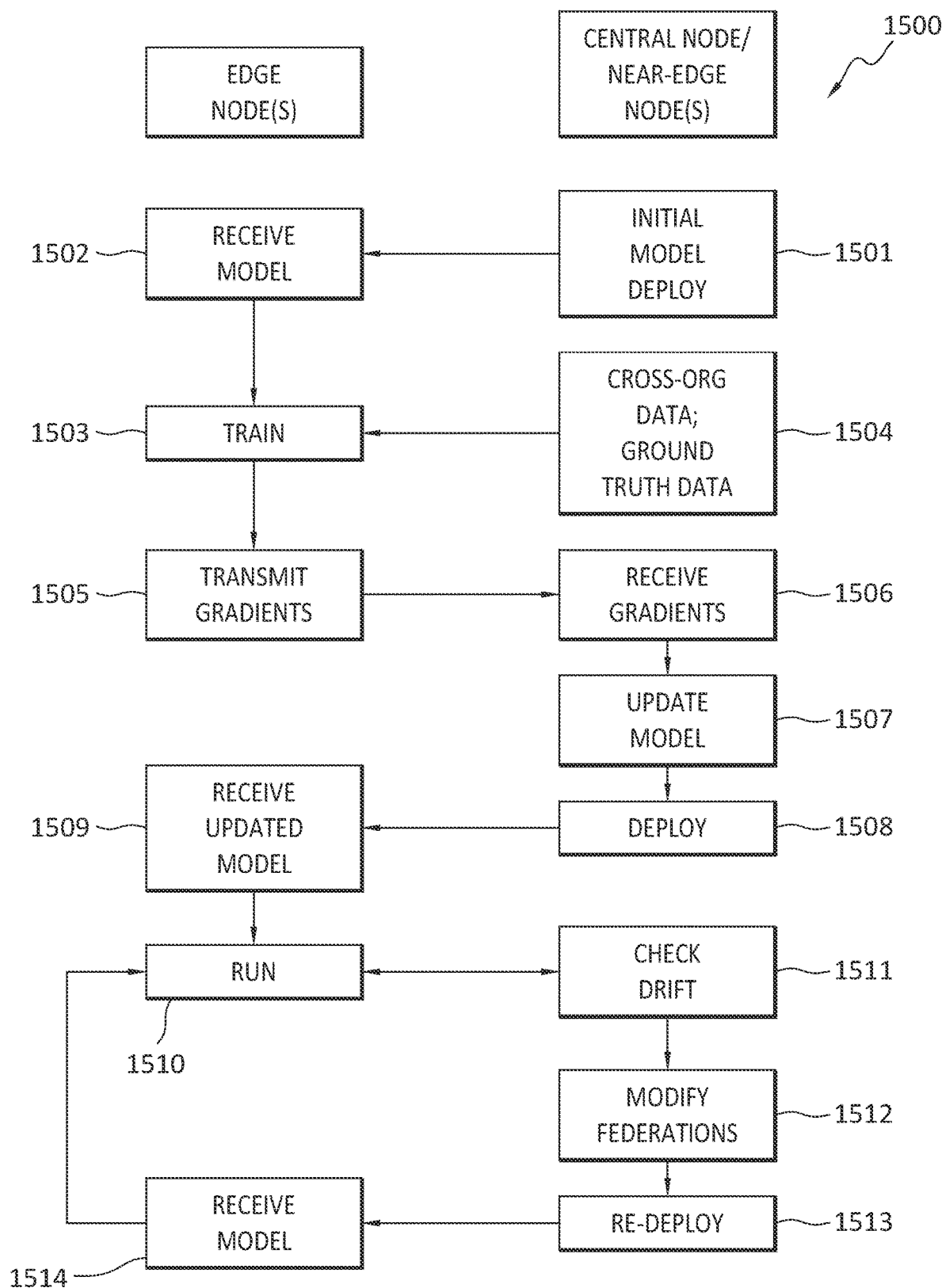
FIG. 15 discloses aspects of an example method, according to some example embodiments.

It is noted with respect to the disclosed methods, including the example method of FIG. 15, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 15, an example method 1500 is disclosed that may be performed cooperatively by a group of one or more edge nodes, and a group of one or more near-edge nodes and a central node. The functional allocation among the various entities disclosed in FIG. 15 is provided only by way of example, and is not intended to limit the scope of the invention in any way.

The method 1500 may begin with an initial deployment 1501 of a model to one or more edge nodes that each comprise one or more sensors operable to collect data concerning an operating environment where the edge nodes are located. The model, which may comprise an ML (machine learning) model may be operable to detect events occurring in the operating environment and/or to predict the occurrence of events in the operating environment. More generally, the model may be operable to detect any event of interest, and/or to predict the occurrence of any event of interest, in any operating environment where edge nodes are, or may be, employed.

Upon deployment 1501, the edge nodes may receive the model 1502. An edge node may then train 1503 the model using data collected by that edge node, and/or using data collected by one or more edge nodes that are members of a different federation than that edge node. The training 1503 may involve making various changes to the model based on the collected data. The changes to the model may be communicated as gradients 1505 to the central node.

Upon receipt 1506 of the gradients, the central node may then update the model 1507 using the gradients. The updated model may then be deployed 1508 to the edge nodes which then receive 1509 the updated model from the central node. The edge nodes may then run 1510 the updated model. This running of the updated model may comprise part of the training process 1503, or may comprise running a production version of the model.

As the model is running, whether the model is in training 1503, or is being run as a final production version, the central node and/or the near-edge nodes may check for model drift 1511. If the model performance has drifted past an established parameter, one or more federations may need to be modified 1512. For example, a federation may be split. In some instances, as a result of multiple splits, the federations may become fragmented, and one or more federations may be merged together 1512.

After the implementation of changes to the federations, an updated version of the model may be re-deployed to the nodes of the new federation, in the case of a federation split. The nodes of the new federation may receive 1514 the updated version of the model and run that model 1510.

E. Further Example Embodiments

Following are some further example embodiments of the invention. These are presented only by way of example and are not intended to limit the scope of the invention in any way.

Embodiment 1. A method, comprising: deploying, from a central node, respective instances of an event detection model to each edge node in a group of edge nodes; providing training data to the edge nodes, wherein the training data is usable by each of the edge nodes to train its respective instance of the model, and wherein the training data comprises ground truth data indicating one or more events that have actually occurred, and/or the training data comprises data obtained from an environment other than an environment in which the edge nodes operate; receiving, by the central node from the edge nodes, gradients that capture differences between the instance of the model, and updated instances of the model that were updated by the edge nodes as part of a training process performed at the edge nodes; updating, by the central node, the model with the gradients to create an updated model; and deploying, by the central node, respective instances of the updated model to the edge nodes.

Embodiment 2. The method as recited in embodiment 1, wherein the central node communicates with the edge nodes by way of one or more near-edge nodes.

Embodiment 3. The method as recited in any of embodiments 1-2, wherein the training data is generated by the edge nodes.

Embodiment 4. The method as recited in any of embodiments 1-3, wherein each of the edge nodes is implemented by a respective forklift.

Embodiment 5. The method as recited in any of embodiments 1-4, wherein each of the edge nodes comprises a respective sensor.

Embodiment 6. The method as recited in any of embodiments 1-5, further comprising monitoring, by the central node, the updated model for drift.

Embodiment 7. The method as recited in embodiment 6, wherein when drift exceeding an established threshold is detected, the method further comprises making a change to a federation to which some of the edge nodes belong.

Embodiment 8. The method as recited in embodiment 7, wherein the change to the federation comprises splitting the federation so as to create a new federation.

Embodiment 9. The method as recited in embodiment 8, further comprising deploying a version of the model to the new federation.

Embodiment 10. The method as recited in any of embodiments 1-9, further comprising merging a federation to which some of the edge nodes belong, with another federation.

Embodiment 11. A system for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 16:
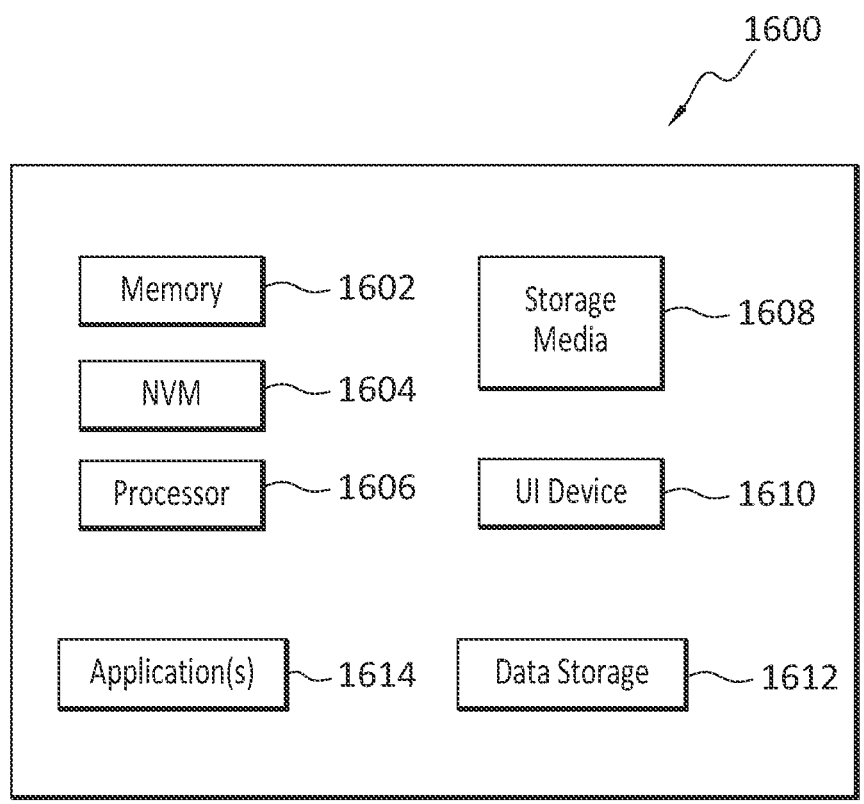
FIG. 16 discloses aspects of an example computing entity operable to perform any of the claimed methods, processes, and operations.

With reference briefly now to FIG. 16, any one or more of the entities disclosed, or implied, by FIGS. 1-15 and/or elsewhere herein, may take the form of, or include, or be implemented on, or hosted by, a physical computing device, one example of which is denoted at 1600. As well, where any of the aforementioned elements comprise or consist of a virtual machine (VM), that VM may constitute a virtualization of any combination of the physical components disclosed in FIG. 16.

In the example of FIG. 16, the physical computing device 1600 includes a memory 1602 which may include one, some, or all, of random access memory (RAM), non-volatile memory (NVM) 1604 such as NVRAM for example, read-only memory (ROM), and persistent memory, one or more hardware processors 1606, non-transitory storage media 1608, UI device 1610, and data storage 1612. One or more of the memory components 1602 of the physical computing device 1600 may take the form of solid state device (SSD) storage. As well, one or more applications 1614 may be provided that comprise instructions executable by one or more hardware processors 1606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   deploying, from a central node, respective instances of an event detection model to each edge node in a group of edge nodes;
   providing training data to the edge nodes, wherein the training data is usable by each of the edge nodes to train its respective instance of the event detection model, and wherein the training data comprises ground truth data indicating one or more events that have actually occurred, and/or the training data comprises data obtained from an environment other than an environment in which the edge nodes operate;
   receiving, by the central node from the edge nodes, gradients that capture differences between the instance of the event detection model, and updated instances of the event detection model that were updated by the edge nodes as part of a training process performed at the edge nodes;
   creating a new federation by splitting an existing federation of the group of edge nodes based on drifts among the gradients, wherein each federation has its own event detection model and any two federations have different event detection models from each other;
   updating, by the central node, an event detection model of each federation with the gradients to create an updated model; and
   deploying, by the central node, respective instances of the updated model to each federation, to which a respective portion of the edge nodes belongs.

2. The method as recited in claim 1, wherein the central node communicates with the edge nodes by way of one or more near-edge nodes.

3. The method as recited in claim 1, wherein the training data is generated by the edge nodes.

4. The method as recited in claim 1, wherein each of the edge nodes is implemented by a respective forklift.

5. The method as recited in claim 1, wherein each of the edge nodes comprises a respective sensor.

6. The method as recited in claim 1, further comprising monitoring, by the central node, the updated model for drift.

7. The method as recited in claim 6, wherein when drift exceeding an established threshold is detected, the new federation to which some of the edge nodes belong is created.

8. The method as recited in claim 1, further comprising deploying a version of the event detection model to the new federation.

9. The method as recited in claim 1, further comprising merging two or more federations, to which some of the edge nodes belong, into one federation, when drift between gradients of the two or more federations is less than a threshold.

10. A non-transitory storage medium having stored therein instructions that are executable by one or more hardware processors to perform operations comprising:
    deploying, from a central node, respective instances of an event detection model to each edge node in a group of edge nodes;
    providing training data to the edge nodes, wherein the training data is usable by each of the edge nodes to train its respective instance of the event detection model, and wherein the training data comprises ground truth data indicating one or more events that have actually occurred, and/or the training data comprises data obtained from an environment other than an environment in which the edge nodes operate;
    receiving, by the central node from the edge nodes, gradients that capture differences between the instance of the event detection model, and updated instances of the event detection model that were updated by the edge nodes as part of a training process performed at the edge nodes;
    creating a new federation by splitting an existing federation of the group of edge nodes based on drifts among the gradients, wherein each federation has its own event detection model and any two federations have different event detection models from each other;
    updating, by the central node, an event detection model of each federation with the gradients to create an updated model; and
    deploying, by the central node, respective instances of the updated model to each federation, to which a respective portion of the edge nodes belongs.

11. The non-transitory storage medium as recited in claim 10, wherein the central node communicates with the edge nodes by way of one or more near-edge nodes.

12. The non-transitory storage medium as recited in claim 10, wherein some of the training data is generated by the edge nodes.

13. The non-transitory storage medium as recited in claim 10, wherein each of the edge nodes is implemented by a respective forklift.

14. The non-transitory storage medium as recited in claim 10, wherein each of the edge nodes comprises a respective sensor.

15. The non-transitory storage medium as recited in claim 10, further comprising monitoring, by the central node, the updated model for drift.

16. The non-transitory storage medium as recited in claim 15, wherein when drift exceeding an established threshold is detected, the new federation to which some of the edge nodes belong is created.

17. The non-transitory storage medium as recited in claim 10, wherein the operations further comprise deploying a version of the event detection model to the new federation.

18. The non-transitory storage medium as recited in claim 10, wherein the operations further comprise merging two or more federations to which some of the edge nodes belong, into one federation, when drift between gradients of the two or more federations is less than a threshold.

* * * * *